F. D. SCHNEIDER.
PUNCTURE ALARM.
APPLICATION FILED DEC. 12, 1910.
1,025,100.
Patented Apr. 30, 1912.
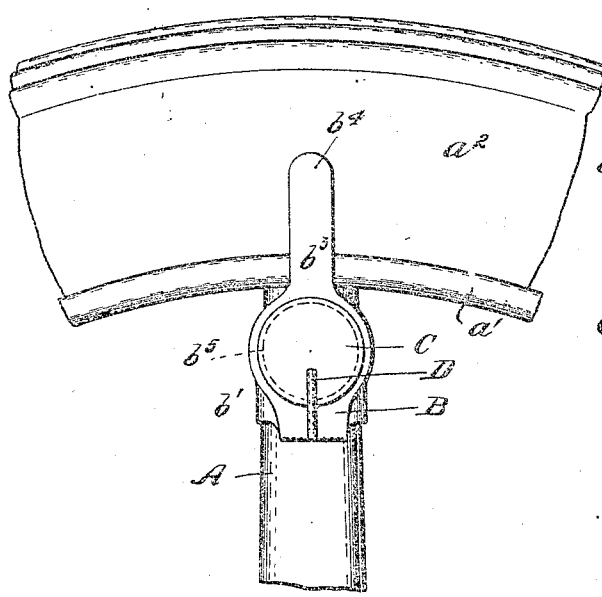
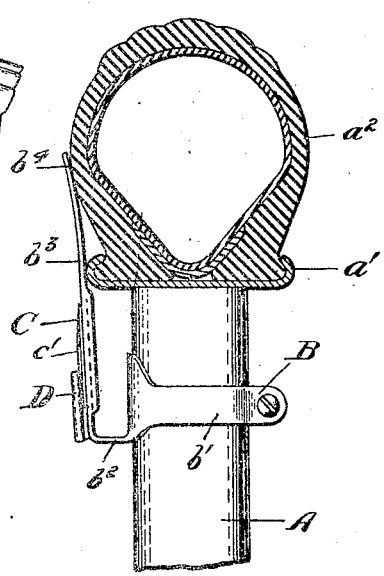
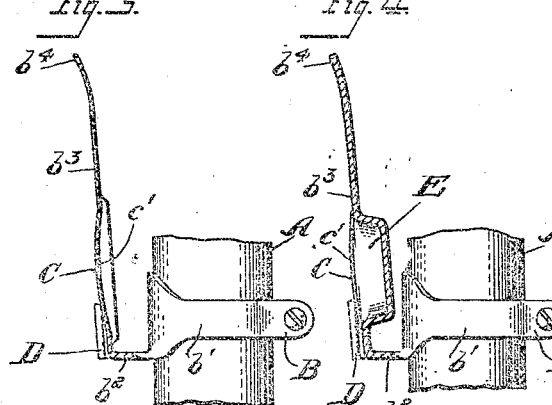
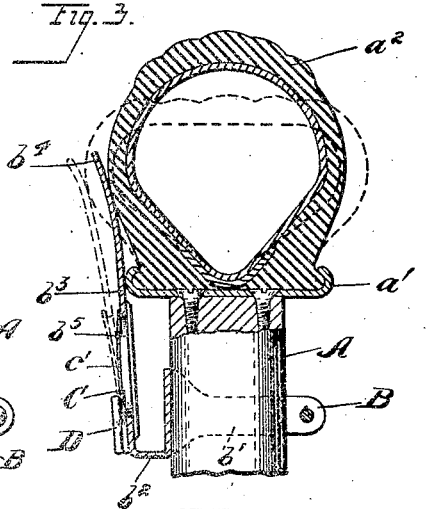
Witnesses
Inventor:
Frederick D. Schneider
by
his Attorney

UNITED STATES PATENT OFFICE.

FREDERICK D. SCHNEIDER, OF BEDFORD, OHIO.

PUNCTURE-ALARM.

1,025,100.

Specification of Letters Patent. Patented Apr. 30, 1912.

Application filed December 12, 1910. Serial No. 596,765.

*To all whom it may concern:*

Be it known that I, FREDERICK D. SCHNEIDER, a citizen of the United States, resident of Bedford, county of Cuyahoga, and State of Ohio, have invented a new and useful Improvement in Puncture-Alarms, of which the following is a specification, the principle of the invention being herein explained and the best mode in which I have contemplated applying that principle, so as to distinguish it from other inventions.

My invention relates to a puncture alarm, and more particularly to such as will be applicable to wheels having pneumatic tires.

One object of the invention is the provision of a thoroughly efficient device characterized by simplicity and corresponding cheapness of manufacture.

Another and more specific object is the provision of an alarm which will readily permit of an adjustment whereby over-deflated as well as punctured tires may be assured of attention.

The said invention consists of means which are hereinafter fully described and particularly set forth in the claims.

The annexed drawings and the following description set forth in detail certain means embodying my invention, the disclosed means, however, constituting but one of various mechanical forms in which the principle of the invention may be applied.

Figure 1 is a front elevation of a device embodying my invention, as applied to the inner side of a wheel. Fig. 2 is a side elevation of the same. Fig. 3 is a similar view, showing the relative position of the parts when the tire is flattened under load. Fig. 4 is a side view of one modification of my invention. Fig. 5 is a similar view of a second modification.

The construction as applied, for example, to the inner side of a wheel having the spoke A, rim $a'$ and pneumatic tire $a^2$, comprises essentially in my preferred construction a primary member B, a clicker C, and an abutting finger D.

The member B may be stamped from a single sheet of metal, one end of which assumes the form of a collar $b'$ serving as a clamp, and as such conforms substantially to the circumference of the spoke A. This clamping collar is positioned in operative proximity to the tire, and may be tightened in the usual manner by means of a screw and nut. The remaining portion of the member B, after extending inwardly a short distance, namely perpendicularly to the spoke, as indicated at $b^2$, is again bent at an angle outwardly toward the tire, that is, in a direction substantially parallel with the spoke. This portion serving as the actuating arm proper, and designated as $b^3$, extends approximately midway of the fully inflated tire. The extremity $b^4$ is curved slightly inward away from the tire, and yet so as to be normally in near or light engagement therewith, as shown in Fig. 2.

Intermediately of the portion $b^2$ and extremity $b^4$ the arm $b^3$ is somewhat widened, and an opening $b^5$ provided, which is preferably circular, as shown. Fixedly secured upon the annular surface around this opening in the arm $b^3$ by rivets or other suitable means, so as to precisely cover said opening, is a circular disk C. The material employed for this disk may be spring brass, phosphor spring bronze, or any other material having similar properties, in order that it may, when its center is properly buckled as at $c'$, serve the purpose of a clicker. As will be manifest, this formation imparts to the extremity $b^4$ of the arm $b^3$, through the medium of the intermediately attached buckled disk, that necessary resiliency the degree of which is indicated in dotted lines in Fig. 3.

Fixedly secured to the angular substantially fixed junction of the portion $b^2$ and arm $b^3$, and extending parallel with the latter to a point somewhat short of the center of and normally contiguous to the disk C, is a rigid abutting finger D, the operative purpose of which, though simple, will presently more clearly appear.

The operation of the device is identical, whether adjusted to sound the alarm only when the tire is punctured, or earlier when merely over-deflated, and is as follows: Directly the tire has become sufficiently flattened, the extremity $b^4$ will be positively moved in a lateral direction as appearing in Fig. 3. This movement is moreover intermittently back and forth about the portion $b^2$ as a pivot. When the arm $b^3$ is so actuated, the buckled portion of the clicker C will be pressed back against the finger D, so as to laterally alter its plane after the manner indicated in dotted lines in Fig. 3, and hence sound one-half of the alarm. Immediately upon the release from weight of that portion of the tire under the spoke to which the device is attached, the extremity $b^4$ will become released and the resilience of the member B permitted to spring into normal position and hence effect the reverse clicking, or second half of the alarm. This double clicking is thereafter effected with each revolution of the wheel, as will be readily understood.

Figs. 4 and 5 represent modifications of the clicking means proper. In Fig. 4, the arm $b^3$ is bent in to form a cup-shaped concavity E capable of serving as a sound box when covered with the disk C. In Fig. 5, the clicker constitutes an integral part of the actuating member.

Having fully described my invention, what I claim and desire to secure by Letters Patent is:

1. In a puncture alarm, the combination with a resilient actuating arm provided intermediately of its ends with a recessed portion, of a buckled member fixedly secured thereto and overlying said recessed portion, said arm being further provided with a finger abutting said member and fixed relative to the movement of said arm.

2. In a puncture alarm, the combination with a resilient actuating arm provided with a recess, of a buckled member secured to said arm over said recess.

3. In a puncture alarm, the combination with a resilient actuating arm having a cup-shaped portion, of a buckled member secured thereto and closing said portion.

4. In a puncture alarm, the combination of a wheel comprising a spoke and pneumatic tire, a laterally resilient actuating arm provided intermediately of its ends with a recessed portion and connected with said spoke, adapted to be engaged by said tire, and a clicker comprising a buckled disk fixedly secured to said member and covering said recessed portion.

5. In a puncture alarm, the combination of a wheel comprising a pneumatic tire, an angularly bent member having one arm secured to said wheel, the other of said arms being resilient relative thereto and adapted to be engaged by said tire, said resilient arm being provided intermediately of its ends with a buckled portion, and a finger secured to said member and abutting said buckled portion, said finger being fixed relative to the movement of said resilient arm.

6. In a puncture alarm, the combination of a wheel comprising a plurality of spokes and a pneumatic tire; a supporting member fixedly secured to one of said spokes, and provided with a resilient arm normally extending laterally adjacent said inflated tire, said arm being provided with a recess extending in the direction of movement, a buckled member fixedly secured to said arm about said recess; and an abutting finger secured to said supporting member and engaging said buckled member.

Signed by me, this 9th day of December 1910.

FREDERICK D. SCHNEIDER.

Attested by—
ELSE GEUDER SCHNEIDER,
CURT BERTHOLD MUELLER.